H. DIETZ.
FOOT REST FOR AUTOMOBILE ACCELERATOR PEDALS.
APPLICATION FILED OCT. 19, 1917.

1,276,189. Patented Aug. 20, 1918.

Witnesses:
Clarence Perdew
Irene Parker

Inventor
Herbert Dietz
By James N. Ramsey
Attorney.

UNITED STATES PATENT OFFICE.

HERBERT DIETZ, OF CINCINNATI, OHIO.

FOOT-REST FOR AUTOMOBILE-ACCELERATOR PEDALS.

1,276,189.   Specification of Letters Patent.   Patented Aug. 20, 1918.

Application filed October 19, 1917.   Serial No. 197,462.

*To all whom it may concern:*

Be it known that I, HERBERT DIETZ, a citizen of the United States, and a resident of Cincinnati, in the county of Hamilton and State of Ohio, have invented certain new and useful Improvements in Foot-Rests for Automobile-Accelerator Pedals, of which the following is a specification.

My invention relates to automobile accessories, and its object is to increase the convenience and comfort of the driver of a motor vehicle and to insure a more uniform application of power, particularly when passing over rough places.

My invention consists in the combination and arrangement of parts and in the details of construction, as hereinafter more fully described and claimed.

Figure 1:
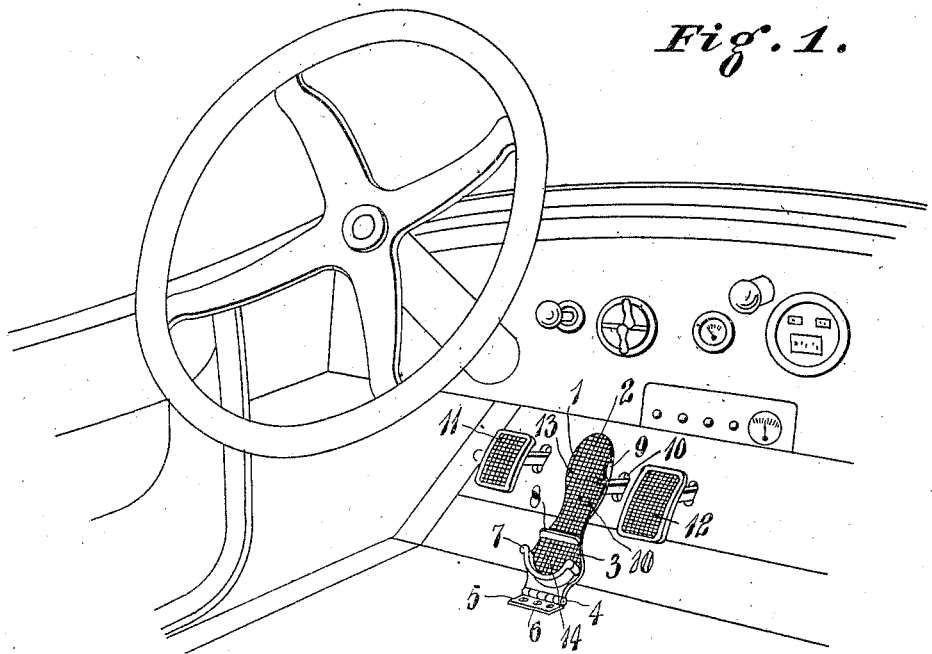
Figure 1 is a perspective view of the front part of the interior of a motor vehicle showing my invention applied thereto.
Figure 2:
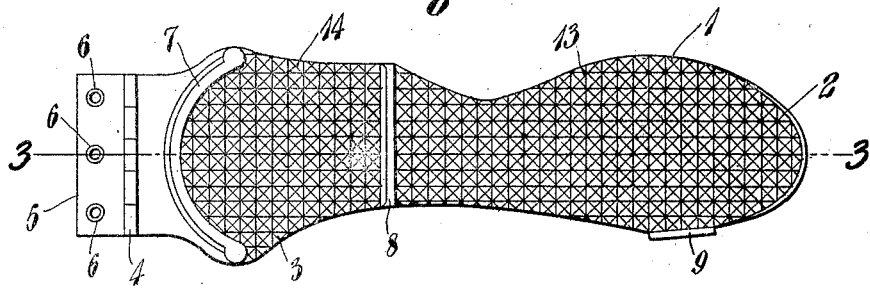
Fig. 2 is a plan view of a device embodying my invention.

As herein shown, my invention is embodied in the form of an elongated metal plate 1 with its front end part 2 slightly upturned and being of contour in its front part approximating that of a shoe sole. The rear end part 3 is somewhat broadened and provided with a hinge 4 connecting it to a floor-plate 5 which has a series of holes 6 through which screws may be passed to fasten it to the floor of the automobile body, or the plate 1 may be otherwise suitably pivoted to the floor.

Just forward of the hinge connection 4, the plate 1 preferably has a curved heel-rest 7 which has its concave side presented forwardly; and an ample distance forward from this heel-rest 7 to admit the largest sized shoe heel is the forward heel-stop 8 extending across the plate and preferably of straight formation. The front end part 2 has at its left side an upwardly projecting lateral stop 9 to be engaged by the inner side of the shoe and act as a gauge to indicate to the driver the proper position of the foot on the foot-rest as well as to prevent the toe from slipping laterally. It will be understood that the foot is placed on the foot-rest with the heel of the shoe between the parts 7 and 8 and the sole of the shoe bearing on the front upwardly inclined part 2 which thus conforms to the downwardly convex shape of the shoe sole.

Not only does the lateral stop 9 act as a lateral gage for the foot, but the forward heel-stop 8 acts as a forward gage; while the heel-rest 7 serves to support the foot on the foot-rest and relieve the driver of the strain incurred in the ordinary manipulation of the accelerator-pedal of an automobile.

The device thus or similarly constructed, is applied as shown in Fig. 1 where the accelerator-pedal 10 is seen projecting back out of the forwardly upwardly inclined part of the floor of the automobile body between the clutch pedal 11 and the brake pedal 12. My improved accelerator foot-rest has its floor-plate 5 attached to the horizontal part of the floor somewhat to the rear of the engageable part of the accelerator-pedal 10, so that the plate 1 leans forward against the pedal 10, as shown, and has the middle of its forward part 2 slidably bearing on said pedal.

Thus provided, the driver may rest the foot on this foot-rest at all times, and the stops or gages 8 and 9 indicate to the driver the proper position of the foot without the necessity of looking at the foot-rest.

Figure 3:
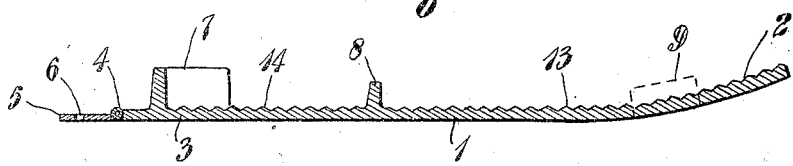
Fig. 3 is a longitudinal vertical section on a plane corresponding to the line 3—3 of Fig. 2.

The lower side of the plate 1 is preferably smooth, as shown in Fig. 3, to permit of sliding engagement with the accelerator pedal but the upper side throughout the parts 2 and 3 which are engaged by the sole and heel, respectively, of the shoe are preferably provided with corrugations 13 and 14 to minimize slippage, as with any foot-rest or pedal.

In the example herein utilized, the foot-rest is provided for the right foot, but it will be understood that it may be provided for the left foot where the construction of the automobile requires this; or the same foot-rest may be used for either foot. Other minor variations may be made in accordance with various requirements; and the foot-rest may be made of any suitable material, although it is preferably cast in a single piece of metal with the floor-plate 5 of wrought metal hinged thereto.

While an important function of the device is to afford a constant rest for the foot, it also serves to securely hold and support the heel so that in going over rough or uneven surfaces a uniform pressure on the accelerator is obtained, thus providing for uniform application of power to the automobile.

Having fully described my invention, what I claim as new and desire to secure by Letters Patent is:

A foot-rest for automobile-accelerator pedals, comprising a foot-plate, and an upwardly extending heel-rest on the rear of said foot-plate, and a floor-plate hinged to said foot-plate to the rear of said heel-rest, said floor-plate being adapted to be fastened to the floor of a vehicle, and said foot-plate being adapted to incline forwardly and upwardly and make operative contact with the accelerator pedal of the vehicle, and to support the foot of the operator of the vehicle for forward pressure against said accelerator-pedal, but normally affording a stable support for the foot while bearing backwardly and downwardly on said heel-rest, substantially as and for the purposes set forth.

HERBERT DIETZ.

Witnesses:
CLARENCE PERDEW,
IRENE PARKER.